United States Patent
Obermuller

(10) Patent No.: US 9,414,567 B2
(45) Date of Patent: Aug. 16, 2016

(54) ROTARY MILKING PARLOUR AND A METHOD FOR SUCH A ROTARY MILKING PARLOUR

(71) Applicant: DELAVAL HOLDING AB, Tumba (SE)

(72) Inventor: Helmut Obermuller, Bromma (SE)

(73) Assignee: DELAVAL HOLDING AB, Tumba (SE)

( * ) Notice: Subject to any disclaimer, the term of this patent is extended or adjusted under 35 U.S.C. 154(b) by 119 days.

(21) Appl. No.: 14/405,483

(22) PCT Filed: Feb. 22, 2013

(86) PCT No.: PCT/SE2013/050159
§ 371 (c)(1),
(2) Date: Dec. 4, 2014

(87) PCT Pub. No.: WO2014/014397
PCT Pub. Date: Jan. 23, 2014

(65) Prior Publication Data
US 2015/0181836 A1    Jul. 2, 2015

Related U.S. Application Data

(60) Provisional application No. 61/673,775, filed on Jul. 20, 2012.

(30) Foreign Application Priority Data

Jul. 20, 2012    (SE) ..................................... 1250880

(51) Int. Cl.
*A01K 1/12*    (2006.01)
*A01J 5/007*    (2006.01)
(Continued)

(52) U.S. Cl.
CPC ............... *A01K 1/126* (2013.01); *A01J 5/007* (2013.01); *A01J 5/01* (2013.01); *A01J 5/017* (2013.01); *A01J 5/0131* (2013.01); *A01J 5/0133* (2013.01)

(58) Field of Classification Search
CPC .......... A01K 1/126; A01J 5/01; A01J 5/0131; A01J 5/0133; A01J 5/007; A01J 5/017
See application file for complete search history.

(56) References Cited

U.S. PATENT DOCUMENTS 3,709,196 A    1/1973    Hicks
3,999,517 A    12/1976    Andersson
(Continued)

FOREIGN PATENT DOCUMENTS

CA    2 775 169 A1    7/2012
CL         13970       2/2011
(Continued)

OTHER PUBLICATIONS

International-Type Search Report, dated Jan. 11, 2013, from corresponding PCT application.
(Continued)

*Primary Examiner* — Stanton L Krycinski
(74) *Attorney, Agent, or Firm* — Young & Thompson

(57) ABSTRACT

A milking parlor and a method includes a rotary platform, plurality of milking stalls arranged on the rotary platform, a common milk line conducting milk from several milking stalls to a common milk tank, a local milk receiver for each milking stall and a valve member controlling the milk flow from the local milk receiver to the common milk line. The valve members are controlled such that all milk of acceptable quality from the local milk receiver is discharged, via the common milk line, to the common milk tank before milk of unacceptable quality is discharged from the local milk receivers to the common milk line during a milking period in the milking parlor between two following washing processes of the common milk line.

20 Claims, 4 Drawing Sheets

(51) Int. Cl.
*A01J 5/013* (2006.01)
*A01J 5/01* (2006.01)
*A01J 5/017* (2006.01)

(56) References Cited

U.S. PATENT DOCUMENTS

| | | | | |
|---|---|---|---|---|
| 4,190,020 | A * | 2/1980 | Tamas | A01J 5/01 119/14.08 |
| 5,720,236 | A * | 2/1998 | Carrano | A01J 5/01 119/14.17 |
| 6,038,030 | A * | 3/2000 | van den Berg | A01J 5/0131 119/14.08 |
| 6,105,536 | A | 8/2000 | DeWaard | |
| 6,197,538 | B1 * | 3/2001 | van den Berg | A01J 5/01 422/50 |
| 6,571,731 | B1 * | 6/2003 | Maier, Jr. | A01J 5/007 119/14.08 |
| 6,776,119 | B2 * | 8/2004 | Vijverberg | A01J 5/007 119/14.14 |
| 8,286,584 | B2 * | 10/2012 | Lindstrom | A01K 1/126 119/14.02 |
| 8,499,717 | B2 * | 8/2013 | Birk | A01K 1/126 119/14.03 |
| 8,624,744 | B2 * | 1/2014 | Holmgren | A01J 5/0175 119/14.02 |
| 8,689,736 | B2 * | 4/2014 | Bosma | A01J 5/007 119/14.02 |
| 8,714,107 | B2 * | 5/2014 | Bosma | 119/14.02 |
| 2003/0061993 | A1 * | 4/2003 | Vijverberg | A01J 5/007 119/14.14 |
| 2003/0061994 | A1 * | 4/2003 | Vijverberg | A01J 5/007 119/14.15 |
| 2008/0035063 | A1 | 2/2008 | Birk et al. | |
| 2012/0145082 | A1 * | 6/2012 | Van Den Berg | A01J 5/017 119/14.02 |
| 2013/0087100 | A1 * | 4/2013 | Nilsson | A01J 5/007 119/14.02 |

FOREIGN PATENT DOCUMENTS

| | | |
|---|---|---|
| RU | 2005355 C1 | 1/1994 |
| SE | 0950206 A1 | 5/2010 |
| WO | 00/74472 A1 | 12/2000 |
| WO | 03/090522 A1 | 11/2003 |
| WO | 2005/120220 A1 | 12/2005 |
| WO | 2008/104416 A1 | 9/2008 |
| WO | 2010/112284 A1 | 10/2010 |
| WO | 2011/124531 A1 | 10/2011 |

OTHER PUBLICATIONS

International Search Report, dated May 31, 2013, from corresponding PCT application.
Supplementary International Search Report, dated Sep. 26, 2014, from corresponding PCT application.

* cited by examiner

ROTARY MILKING PARLOUR AND A METHOD FOR SUCH A ROTARY MILKING PARLOUR

THE BACKGROUND OF THE INVENTION AND PRIOR ART

The present invention relates to a rotary milking parlour and a method for such a rotary milking parlour. The rotary milking parlour comprises a rotary platform, plurality of milking stalls arranged on the rotary platform, at least one common milk line conducting milk from several milking stalls to a common milk tank, a local milk line for each milking stall conducting milk from an animal milked in the milking stall to the common milk line, a detecting member for each milking stall configured to detect the quality of the milk in local milk line, a local milk receiver for each milking stall configured to collect the milk in the local milk line and a valve member for each milking stall configured to control the milk flow from the local milk receiver to the common milk line.

In milking parlours, the milk may be monitored during a milking process per quarter with a milk meter measuring milk flow, yield, blood and conductivity. It is here possible to detect the quality of the milk from each teat of a cow. By means of, for example, this information, it is possible to divide the cows in a herd in healthy cows and unhealthy cows. The healthy cows may be about 80-95% of the cows in a herd. The unhealthy cows are milked separately such that the milk from the unhealthy cows is not mixed with the milk from the healthy cows. A further reason to milk the unhealthy cows separately is to prevent spreading of infections from the unhealthy cows to the healthy cows.

However, there is always a risk that some cows in a herd have fallen ill since the last milking process. These cows may be about 0-5% of the cows in a herd. These cows are unhealthy but they are defined as healthy. Since it is not known that these cows are unhealthy, they are milked together with the healthy cows. The milk from these cows is mixed with the milk from the healthy cows. Furthermore, there is also a risk that these cows infect healthy cows which are milked in the same milking stall.

US 2008/0035063 shows a milking parlour comprises a rotary parlour with a plurality of milking stalls with at least one local milk tank in each milking stall. The milking parlour comprises at least two separate milk lines arranged to receive milk from the local milk tank in dependence of the quality of the milk.

SUMMARY OF THE INVENTION

The object of the present invention is to provide a rotary milking parlour where it is possible to select all milk produced by unhealthy cows from the milk produced by healthy cows. A further object is to prevent spreading of infections from unhealthy cow to healthy cows in the milking arrangement.

These objects are achieved by the rotary milking parlour initially defined, which is characterised in that it comprises a control unit configured to control the valve members such that the milk is retained in the local receivers during the whole milking process of the animals, to receive information about the quality of the milk from the detecting members and to control the valve members such that all milk of acceptable quality from the local milk receiver is discharged, via the common milk line, to the common milk tank before milk of unacceptable quality is discharged from the local milk receivers to the common milk line during a milking period in the rotary milking parlour extending between two following washing processes of the common milk line.

Thus, the milk from the milking processes is collected in a local receiver for each milking stall. The control unit determines if the milk in the local receivers is of an acceptable quality or not by means of information from the detecting members. If the milk is of an acceptable quality, the control unit sets the valve member in an open position such that the milk in the local receiver flows to the common milk line where it is mixed with milk from other milking stalls and conducted to the common milk tank. If the milk is of an unacceptable quality, the control unit maintains the valve member in a closed position such that the milk is retained in the local receiver even after the milking process has ended. When all milk of acceptable quality has been discharged to the common milk tank during a milking period in the rotary milking parlour between two following washing processes, the milk of unacceptable quality is discharged from the local receivers to the common milk line. As soon as all local receivers have been emptied the washing process of the common milk line may start. Since all milk of acceptable quality is discharged to the common line before the milk of unacceptable quality, no milk of unacceptable quality will be mixed with milk of acceptable quality.

According to an embodiment of the invention, the milking period is between 6 to 12 hours, preferably about 8 hours. In milking parlours based on voluntary milking, a complete washing process of all milk lines and components in the milk lines are usually performed with intervals of about 8 hours. Thus, the milking period between two following washing processes is in this case about 8 hours. In milking parlour based on batch milking, a complete washing process of all milk lines and components in the milk lines are usually performed when a herd of animals has been milked. In this case, the milk of unacceptable quality has to be retained in the local receivers at least until all healthy animals in the herd have been milked.

According to an embodiment of the invention, the control unit is configured to control the valve members such that milk of acceptable quality is discharged from the local receivers to the common milk tank before a following milking process starts in the milking stall. Preferably, the milk of acceptable quality is discharged to the common milk line as soon as a milking process has ended in a milking stall.

According to an embodiment of the invention, the control unit is configured to control the valve member such that the unacceptable milk in the local receiver is discharged, via the common milk line to a milk tank for unacceptable milk. The milk tank for unacceptable milk may be connected to the common milk line via a valve member. When the local receiver is to be emptied, the valve member is set in a position such that it directs the milk in the common milk line to the milk tank for milk of unacceptable quality. In this case, the milk of unacceptable quality may be conducted to the milking tank for milk of unacceptable quality in the same manner as the milk of acceptable quality is conducted to the common milk tank for milk of acceptable quality. A vacuum source may be used to conduct the milk in a first part of the common milk line to a common receiver before a pump moves the milk to the tank for milk of unacceptable quality.

According to an embodiment of the invention, the rotary milking parlour comprises a movably arranged blocking member and a control unit configured to control the blocking member such that it prevents following animals to enter a milking stall when milk of unacceptable quality has been detected from an animal milked in the milking stall wherein said milking stall is vacant when the platform rotates during the remaining part of the milking period. Since the milk from this animal is of an unacceptable quality, the animal is probably unhealthy. The washing process may be a complete washing process of all milk lines and its connected components. In this case, no animal has access to the milking stall before, the teat cups and its associated milk tubes have been washed. Spreading of infections to other animals is thereby prevented. The measure to block a milking stall reduces the capacity of the milking parlour. However, the numbers of animals, which have been ill since the last milking process, are usually very low. In view of this fact, the number of blocked milking stalls will be few. Consequently, the capacity of the milking parlour will not be significantly reduced by this measure.

According to an embodiment of the invention, the blocking member is arranged in a passage leading to at least one milking stall, wherein the blocking member is movably arranged between an open position, in which it allows an animal to enter the milking stall, and a closed position, in which it prevents an animal to enter the milking stall. Such a blocking member may be a gate or a movable bar which is controlled by the control unit.

According to an embodiment of the invention, the blocking member is positioned outside the platform in a passage leading to at least one milking stall on the platform. Such a blocking gate may be an already existing entrance gate to the platform. When a blocked milking stall arrives to a rotational position just in front of the entrance passage, the control unit does not open the entrance gate such that an animal in the entrance passage has to wait until the next milking stall arrives to the entrance passage According to an embodiment of the invention, the movable blocking member is positioned on the platform in a passage leading to at least one milking stall. Such a blocking member may be an already existing retention bar. Certain rotary parlours are equipped with a retention bar in each milking stalls. The object of the retention bar is to prevent the animals to leave the milking when the milking stall enters an exit area. The retention bar may prevent an animal to leave the platform if, for example, the milking process has not been finished. Such an already existing retention bar is possible to use for blocking a milking stall. When a vacant milking stall arrives to a rotational position just in front of the entrance passage with the retention bar in a closed position, it is not possible for an animal to enter the milking stall. In this case, the animal has to wait until the next milking stall arrives to the entrance passage for entering the platform According to an embodiment of the invention, the detecting member is comprised in a milk meter in the local milk line. The local milk lines for the milking stalls comprise substantially always a milk meter measuring the milk flow in the local milk line. Such milk meter may be provided with a detecting member detecting the quality of the milk. The detecting member may measure the conductivity in the milk and/or the existence of blood in the milk. A higher conductivity value in the milk than a threshold value may indicate an increased count of somatic cells in the milk and that the animal may have mastitis. Thus, if the conductivity in the milk is too high and/or if there is blood in the milk, the milk has an unacceptable quality.

According to an embodiment of the invention, the local milk receiver is arranged in a position at the inner periphery of the rotary platform. The milk from the milking stalls on the platform is usually received in a circular common milk line arranged at the inner periphery of an annular platform. It is suitable to arrange the local milk tanks at the inner periphery of the platform for several reasons. The length of the local milk lines may, for example, be given a relatively short extension since the common milk line usually is arranged at the inner periphery of the platform. The local milk receiver may be positioned at a level below an upper surface of the platform. It is here possible to give the local receiver a protected location. The local receiver may be arranged in a position under the platform.

The initially mentioned objects are also achieved by the disclosed method.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED EMBODIMENTS OF THE INVENTION

Figure 1:
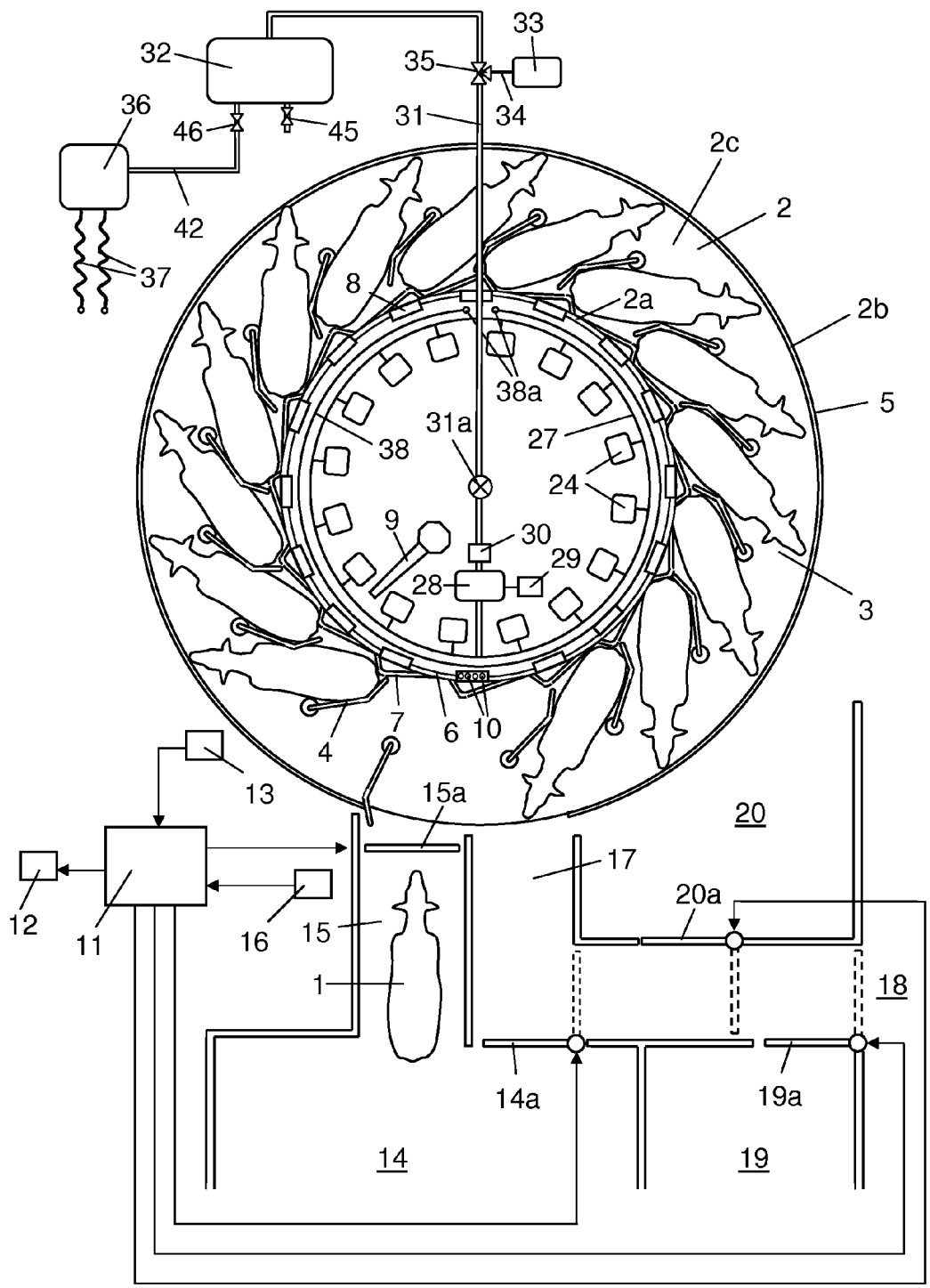
FIG. 1 shows a rotary milking parlour according to a first embodiment of the invention.

FIG. 1 shows a rotary milking parlour for milking of cows 1. The rotary milking parlour comprises an annular platform 2 having an inner edge portion 2a and an outer edge portion 2b. The platform 2 rotates during operation around a vertical axis. The platform 2 has an upper surface 2c forming a support surface for the cows 1. A plurality of rotatable fence members 4 are arranged on the upper surface 2c of the platform 2. The rotatable fence members 4 are here used for dividing the platform 2 into milking stalls 3 for receiving individual cows 1 in predetermined milking positions. By the use of rotatable fence members 4, it is possible to position the cows 1 very close together on the platform 2. An outer fence arrangement 5 is mounted around a common part of the outer periphery of the platform 2. An inner fence arrangement 6 and a rumprail 7 are arranged at the inner edge portion 2a of the platform 2. The object of the rumprail 7 is to position the rear part of the cows 1 in a predetermined milking position in the milking stalls 3. In this milking parlour, the cows 1 are arranged in a herringbone pattern with the heads at the outer edge portion 2b of the platform 2.

A milking robot arm 9 is arranged in a position inside the inner edge portion 2a of the platform 2. Each milking stall 3 comprises a teat cup magazine 8 adapted to hold four teat cups 10 in a parked position when they are not used. Teat cup magazines 8 are arranged at the inner edge 2a of the platform 2. In this case, the teat cup magazines 8 are arranged on one side of a cow 1 in a milking stall 3 and behind a cow 1 standing in an adjacent milking stall 3. When the cows 1 are arranged in a herringbone pattern on a platform 2, the above-mentioned space is normally empty. Therefore, it is very suitable to use this space for the teat cup magazines 8. A control unit 11 is adapted to control a schematically shown drive mechanism 12 for driving of the platform 2. A position sensor 13 is adapted to sense the rotational position of the platform 2 and to send a signal to the control unit 11 about the actual position of the platform 2.

A waiting area 14 is arranged in connection to the platform 2. The waiting area 14 has an entrance passage 15 to the platform 2. An entrance gate 15a is arranged in a front position of the entrance passage 15. An identification sensor 16 is arranged at the entrance passage 15. An exit passage 17 is arranged in the vicinity of the entrance passage 15. The exit passage 17 leads to an exit area 18. In this case, the exit passage 17 comprises a first movable gate 14a by which it is possible to direct a cow back to the waiting area 14, a second movable gate 19a by which it is possible to direct a cow 1 to an area 19 for unhealthy cows and a third movable gate 20a by which it is possible to direct a cow 1 to an area 20 for newly detected unhealthy cows. The movable gates 14a, 19a, 20a are controlled by the control unit 11.

Figure 2:
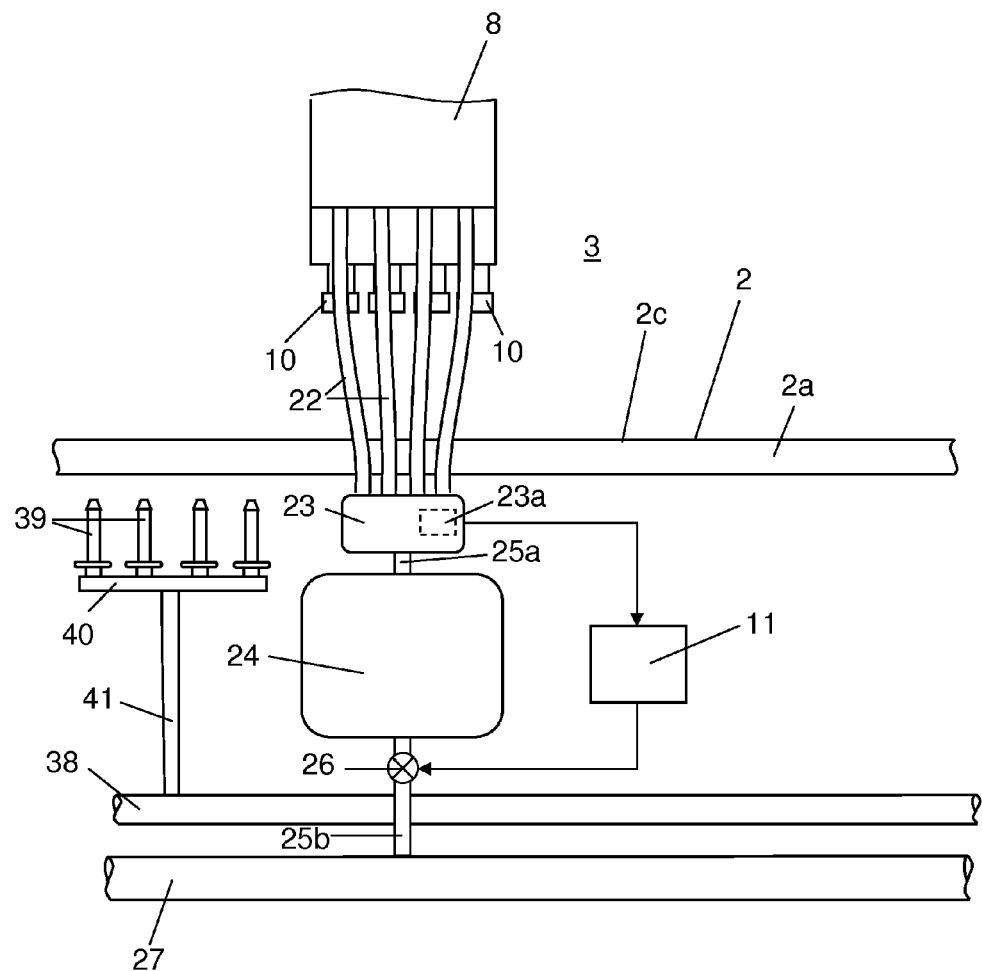
FIG. 2 shows one of the milking stalls in FIG. 1 from a position inside of the platform.

FIG. 2 shows one of the milking stalls 3 in FIG. 1 from the inside of the annular platform 2. In this case, there is no cow 1 in the milking stall 3 and the teat cups 10 are in a parked position in the teat cup magazine 8. During a milking process in the milking stall 3, the four teat cups 10 are attached to a respective teat of a cow 1 in the milking stall 3. The milk from the respective teats flows from the teat cups 10 and a respective milk tube 22 to a milk meter 23. The milk meter 23 measures the milk flow in the respective milk tubes 22. The milk meter 23 also comprises a detecting member 23a which may, for example, measure the conductivity in the milk and the existence of blood in the milk. The control unit 11 receives information about the milk flow from the milk meter 23 and the quality of the milk from the detecting member 23a. A milk conduit 25a leads the milk from the milk meter 23 to a local receiver 24. The local receiver 24 is, via a milk conduit 25b connected to a first part of a common milk line 27 for the milking stalls 3. The milk conduit 25b comprises a valve member 26 controlling the milk flow from the local receiver 24 to the first part of a common milk line 27.

The first part of the common milk line 27 has a circular extension in a position below the upper surface 2c of the platform 2. The first part of the common milk line 27 is connected to a common receiver 28. A schematically disclosed vacuum source 29 is connected to the common receiver 28. The vacuum source 29 sucks milk in the first part of the common milk line 27 to the common receiver 28. A pump 30 is arranged in connection to the common receiver 28. The object of the pump 30 is to pump the milk from the common receiver 28, via a second part of the common milk line 31, to a common milk tank 32 arranged at the outside of the platform 2. The second part of the common milk 31 line comprises a swivel 31a arranged at the vertical rotation axis of the platform 2. A milk tank 33 for unacceptable milk is connectable to the second part of the common milk line 31 via a milk conduit 34 and a valve member 35.

A system washing unit 36 for performing a complete washing process of the milking parlour is arranged outside the platform 2. The system washing unit 36 is, via two flexible wash hoses 37 connectable to a circular wash line 38 at the inner edge portion 2a of the platform 2. The wash hoses 37 are connected to a respective connection 38a of the wash line 38 when the platform is stationary. Each milking stall 3 comprises a washing member 39 in the form of four vertical rod members. The teat cups 10 are placed on a respective rod member 39 during a washing process of the milking parlour. The rod members 39 are, via a horizontal conduit 40 and a vertical conduit 41 connected to the circular wash line 38.

Batch milking is practised in this milking parlour. During operation, a herd of cows 1 to be milked are moved to the waiting area 14. In the waiting area 14, the cows 1 may have possibility to eat concentrated food before walking to the entrance passage 15 leading to the rotary platform 2. The cows 1 in the herd walks in proper order to the enter passage 15. The entrance passage 15 has a width such that only one cow 1 at a time can be located in a front position of the passage 15. The entrance gate 15a is in a closed position when a cow 1 arrives to the front position of the entrance passage 15. The cow 1 carries a transponder containing data about the individual cow 1. The identification sensor 16 reads the transponder and sends a signal to the control unit 11 about the identity of the cow. The control unit 11 receives substantially continuously information from the position sensor 13 about the actual rotational position of the platform 2. When a milking stall 3 arrives to a first rotational position $p_1$, just in front of the entrance gate 15a, the control unit 11 opens the entrance gate 15a.

The control unit 11 has access to information about the individual cows 1 in a herd. The control unit 11 has, for example, information about the identity of the cows in the herd which are healthy and unhealthy. The control unit 11 stores information about the identity of the cow 1 and the milking stall 3 used by the cow 1. When the control unit 11 opens the entrance gate 15a, the cow 1 enters the milking stall 3. The entrance gate 15a is moved to its closed position as soon as the whole cow 1 is on the platform 2. The cow 1 walks around the pivot of the fence member 4 and enters a milking stall 3 on the platform. The fence member 4 is moved to a position in contact with the cow 1 by means of a not shown control member.

If the cow 1 has been determined to be healthy, the control unit 11 activates the robot arm 9 such that it fetches the teat cups 10 from the teat cup magazine 8 and attaches them to the cow 1 when the milking stall 3 has reached a second rotational position $p_2$. The platform 2 is driven with a slow speed such that it is no problem for the robot arm 9 to compensate for the relative motions between the cow 1 on the platform 2 and the robot arm 9 during the attaching process of teat cups 7 to the cow 1. On the other hand, if the cow 1 has been determined to be unhealthy, the control unit 11 does not activate the robot arm 9 when the milking stall 3 has reached the second rotational position $p_2$. Thus, the teat cups 10 will not be attached to the cow 1 and the unhealthy cow 1 will not be milked.

The milking process of the healthy cow 1 starts when all teat cups 10 have been attached to the cow 1. The milk meter 23 supervises the milk flow during the milking process. At the same time, the detecting member 23a in the milk meter 23 measures the conductivity in the milk and the existence of blood in the milk. The control unit 11 receives information about the milk flow from the milk meter 23 and the quality of the milk from the detecting member 23a based on the conductivity and the existence of blood in the milk. The valve member 26 is in a closed position such that all milk from the cow 1 is collected in the local receiver 24 during the milking process.

As soon as the milk flow drops below a predetermined value, a removing device, which is arranged in the teat cup magazine 8, removes the teat 10 from the teats of the cow 1. The control unit 11 determines if the milk in the local receiver 24 is acceptable by means of information from the detecting member 23a. If the quality of the milk is acceptable, the control unit 11 opens the valve member 26 and the milk flows from the local receiver 24 to the first part of the common milk line 27. The milk in the first part of the common milk line 27 is sucked by means of the vacuum source 29 to the common receiver 28. The milk is then pumped by the pump 30, via the second part of the common milk line 31 to the common milk tank 32 at the outside of the platform 2.

On the other hand, if the quality of the milk is not acceptable, the control unit 11 does not open the valve 26. The control unit 11 notes the identity of the cow 1 and the milking stall 3. The cow 1 may have mastitis. In case there are bacteria in the milk, it is a risk that a following cow in the milking stall will be infected. In order to prevent this risk, the control unit 11 blocks the milking stall 3 until all cows in the herd have been milked and it is time to perform a complete washing process of the milking parlour. In order to block the milking stall 3, the control unit 11 controls the entrance gate 15a such that it does not open when this milking stall 3 arrives to the first rotation position $p_1$.

During a milking process, the teat cups 10 are at least removed when the milking stall 3 arrives to a third last rotational position $p_{n-2}$. In the second last rotational position $p_{n-1}$, a treatment supplying device may spray a disinfecting medium or another kind of treatment medium to the teats of the cow 1. Finally, when the milking stall 3 reaches a last rotational position $p_n$, the cow 1 leaves the milking stall 3 and enters the exit passage 17. Thereafter, the milking stall 3 again will be rotated to the first rotational position $p_1$ and be ready to receive a new cow 1.

The control unit 11 controls the gates 14a, 19a, 20a in the exit passages 17. If a cow 1 entering the exit passages 17 has been deemed to be healthy before the milking process and the milk has been deemed as acceptable, the gates 14a, 19a, 20a is positioned in the positions shown with solid lines in FIG. 1. In this case, the cow 1 leaves the exit passage 17 and enters the exit area 18. If the milking process of a cow 1 not has been completed before the milking stall 3 has reached the second last rotational position $p_{n-2}$, the control unit 11 moves the gate 14a to the position shown with dashed lines in FIG. 1. This cow 1 is directed back to the waiting area 14 and to a continued milking process on the platform 2. If a cow 1 entering the exit passages 17 initially has been deemed to be unhealthy, the cow 1 has not been milked on the platform 2. When such a cow 1 enters the exit passage 17, the gate 19a is moved to the position shown with dashed lined in FIG. 1. The cow 1 is directed to the area 19 for unhealthy cows 1. When all healthy cows 1 in the herd has been milked, the cows 1, which has been deemed to be unhealthy, are moved to the waiting area 14 and milked. Since the healthy cows 1 in the herd are milked before the unhealthy cows 1 the spreading of infections from the unhealthy cows 1 to the healthy cows 1 is prevented.

Finally, the herd may include cows 1, which have been deemed to be healthy, but they have produced milk of unacceptable quality. When such a cow 1 enters the exit passage 17, the gate 20a is moved to the position shown with dashed lined in FIG. 1. This cow 1 is directed to the area 20 for newly detected unhealthy cows 1. An investigation of the cows 1 in this area 20 may be performed before they are allowed to enter the exit area 18. Such cows 1 are determined to be unhealthy the next time they are going to be milked.

When all cows in the herd have been milked, a relatively large number of the local receivers 24 may include milk of unacceptable quality. The valve member 35 is set in a position such that it guides the milk in the second part of the common milk line 31 to the milk tank 33 for unacceptable milk. Thereafter, all valve members 26 are set in an open position. The milk of unacceptable quality flows into the first part of the common milk line 27. The milk is sucked by the vacuum source 29 towards the common receiver 28. The unacceptable milk is then pumped by the pump 30 through the second part of the common milk line 31 to the milk tank 33 for unacceptable milk. In this case, no milk of unacceptable quality will be mixed with milk of acceptable quality in the common milk tank 32.

A complete washing process of the milking parlour is performed when all cows 1 in the herd have been milked. The platform 2 is stationary during the washing process. Before the washing process is started, the common milk tank 32 is emptied of milk by means of a valve member 45. Furthermore, the teat cups 10 in each milking stall are placed on the rod shaped washing members 39. The wash hoses 37 are attached to a respective connection 38a of the circular wash line 38. The system washing unit 36 supplies washing liquid with a predetermined temperature through the wash hoses 37 to the circular wash line 38. The washing liquid flows through the vertical tubes 41 and the horizontal tubes 40 to the rod shaped members 39 in each milking stall 3. The washing liquid flows into the teat cups 10 and the milk tubes 22. The washing liquid flows through the milk meters 23 and to the local milk receivers 24.

All valve members 26 are in an open position such that the washing liquid flows from the local receivers 24 to the first part of the common milk line 27. The washing liquid is sucked through the first part of the common milk 27 to the common receiver 28 by means of the vacuum source 29. The washing liquid is pumped from the common receiver 28 to the second part of the milk line 31 and to the milk tank 32. The washing liquid flows from the milk tank 32 back to the system washing unit 36 via a wash line 42 and an open valve member 46. The washing liquid may be heated to the predetermined temperature in the system washing unit 36 before it again circulates through the wash line 38 and the milking lines. Such a complete washing process takes at least one hour. When the washing process has been finished, it is possible to use all milking stall 3 on the platform 2.

Figure 3:
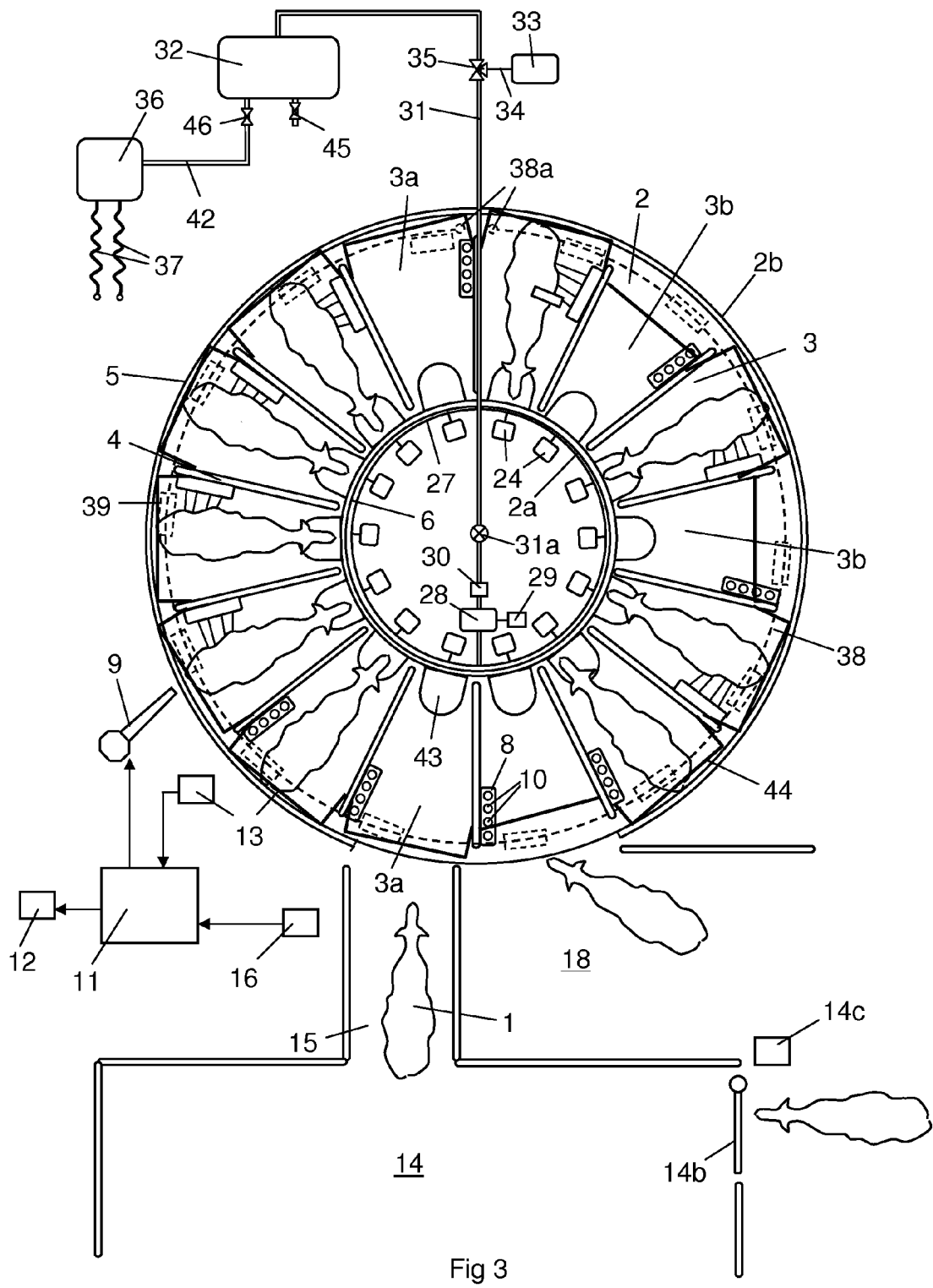
FIG. 3 shows a rotary milking parlour according to a second embodiment of the invention and FIG. 4 shows one of the milking stalls in FIG. 3 from a position inside of the platform.

FIG. 3 shows rotary milking parlour in the form of a parallel rotary. In this case, voluntary milking is practised. The rotary milking parlour comprises an annular platform 2 having an inner edge portion 2a and an outer edge portion 2b. A plurality of stationary fence members 4 are arranged on the upper surface of the platform 2. The fence members 4 form milking stall 3 for receiving individual cows 1. In this case, the fence members 4 have an essentially straight radial extension on the platform 2 between an inner end located at the vicinity of the inner edge portion 2a of the platform and an outer end located at the vicinity of the outer edge portion 2b of the platform. The fence members 4 are arranged at equal intervals around the annular platform 2. An outer fence arrangement 5 is mounted around a main part of the outer periphery of the platform 2 and an inner fence arrangement 6 is mounted around the outer periphery of the platform 2. Each milking stall 3 is provided with a feeding trough 43 arranged in the vicinity of the inner periphery 2a of the platform. Each milking stall 3 is equipped with a teat cup magazine 8 with four teat cups 10 in the vicinity of the outer periphery of the platform 2. A robot arm 9 is here arranged in a position outside the outer edge portion 2b of the platform 2.

A control unit 11 is adapted to control a schematically shown drive mechanism 12 for driving of the platform 2. A position sensor 13 is adapted to sense the rotational position of the platform 2 and to send a signal to the control unit 11 about the actual position of the platform 2. A closed waiting area 14 is arranged in the vicinity to the platform 2. The waiting area 14 has an entrance gate 14b provided with a first identification sensor 14c. A number of feeding stations (not shown) with concentrated food may be arranged in the waiting area 14. The waiting area 14 has an entrance passage 15 to the platform 2. A second identification sensor 16 identifies the cows 1 in a first position of the entrance passage 15. An exit area 18 is arranged in connection to the platform 2. The exit area 18 is entered by the cows 1 when they leave the platform 2.

In this case, each milking stall 3 is equipped with a retention bar 44. The object of the retention bar 44 is to prevent a cow 1 from leaving a milking stall 3 after one revolution on the platform 2. This may be the case if, for example, the milking process has not been finished. The retention bar 44 is pivotally connected to the fence members 4 on opposite sides of the milking stall 3. A not shown operating cylinder turns the retention bar 44 between a closed position and an open position. The retention bar 44 is lowered behind a cow in the milking stall in the closed position such that the retention bar 25 prevents the cow 1 from leaving the milking stall 3. The retention bar 25 is raised to a level above the cow 1 in the open position such that a cow 1 is free to leave the milking stall 3.

Figure 4:
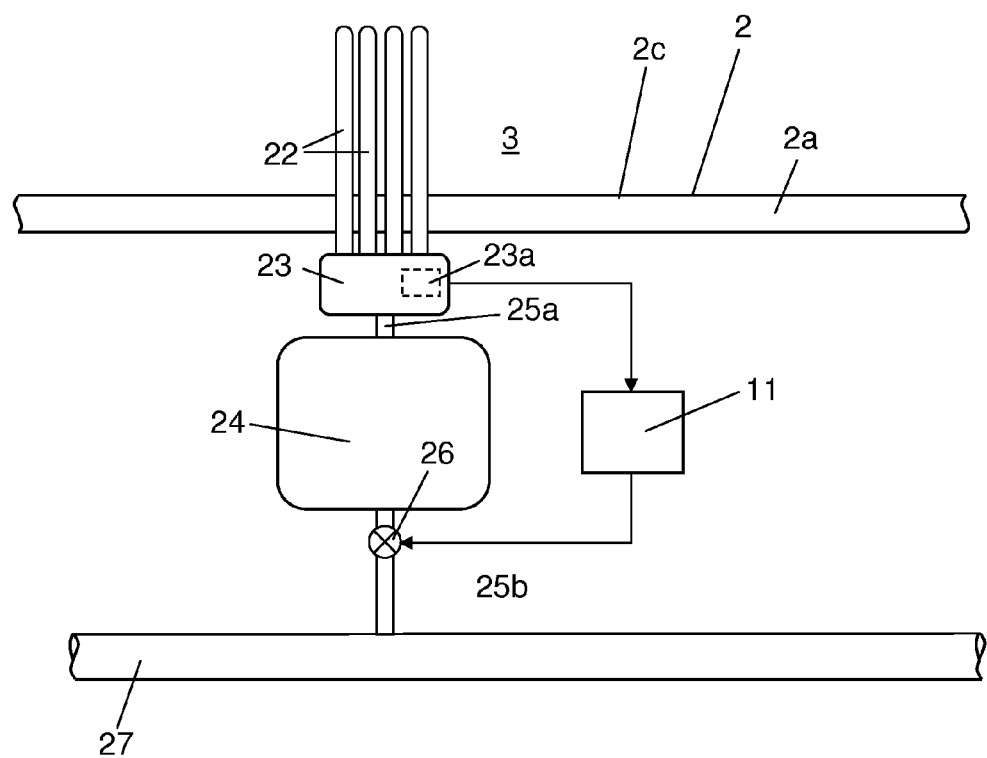

FIG. 4 shows a milking stall 3 from the inside of the platform 2. The teat cups 10 are attached to a respective milk tube 22. The milk tubes 22 has an extension from the teat cup magazine 10 at the outer periphery of the platform 2 to a milk meter 23 arranged at the inner periphery of the platform 2. The milk meter 23 comprises a milk detecting member 23a detecting the quality of the milk 3. The control unit 11 receives information about the milk flow from the milk meter and the quality of the milk from the detecting member 23a. The milk flows from the milk meter 23, via a milk conduit 25a, to a local receiver 24 for each milking stall 3. The local receiver 24 is, via a milk conduit 25b connected to a first part of a common milk line 27 for the milking stalls 3. A valve member 26 is arranged in the milk conduit 25b. The valve 26 is settable in an open position in which the milk in the local receiver 24 flows to the first part of the common milk line 27 and a closed position in which the milk is maintained in the local receiver 24.

The first part of the common milk line 27 has a circular extension below the inner edge portion 2a of the platform 2. The first part of the common milk line 27 is connected to a common receiver 28. A vacuum source 29 is connected to the common receiver 28. The vacuum source 29 sucks milk in the first part of the common milk line 27 to the common receiver 28. A pump 30 is arranged in connection to the common receiver 28. The object of the pump 30 is to pump the milk from the common receiver 28, via a second part of the common milk line 31, to a milk tank 32 arranged at the outside of the platform 2. The second part of the common milk 31 line comprises a swivel 31a arranged at the vertical rotation axis of the platform 2. A milk tank 33 for unacceptable milk is connectable to the second part of the common milk line 31 via a milk conduit 34 and a valve member 35.

Also in this case, a system washing unit 36 is arranged outside the platform 2. The system washing unit 36 is, via two wash hoses 37 connectable to a circular wash line 38 arranged at the outer edge portion 2a of the platform 2 and in a position below the platform 2. Each milking stall 3 comprises a washing member 39 arranged at the outer edge portion 2a of the platform 2 in a position below the platform 2. The washing member 39 may comprise rod shaped members and have the same design as the washing members in FIG. 2. The teat cups 10 are placed on the washing member 39 during a washing process. The washing members 39 are connected, via a suitable wash line, to the circular wash line 38.

A cow 1 which wants to be milked walks to the entrance gate 14b of a waiting area 14. The cow 1 carries a transponder containing data about the individual cow 1. The first identification sensor 14c reads the transponder and sends a signal to the control unit 11 about the identity of the cow 1. The control unit 11 concludes if the cow 1 will be granted a milking permission or not. If the cow 1 allows a milking permission, the entrance gate 14b is open and the cow 1 enters the waiting area 14. If the cow 1 is not granted a milking permission, the entrance gate 14b is not open and the cow 1 is not allowed to enter the waiting area 14. In this case, only cows 1, which has been deemed as healthy, will be granted milked permission.

Thus, cows 1, which has been deemed as unhealthy, will not be granted to be milked. This group of cows may be milked separately.

In the waiting area 14, the cow 1 eats concentrated food in a feeding station before walking to the entrance passage 15 leading to the rotary platform 2. The entrance passage 15 has a width such that only one cow 1 at a time can be located in a front position of the passage 15. The second identification sensor 16 identifies the cow 1 when it arrives to the front position of the passage 15 and sends a signal to the control unit 11 about the identity of the cow 1. As soon as a vacant milking stall 3, in which the retention bar 44 is an open position, arrives to the first rotary position $p_1$ the cow 1 enters the milking stall 3.

The feeding trough 43 attracts the cow 1 and facilitates the positioning of the cow 1 in the milking stall 3. In this milking arrangement, the cows 1 stand in a radial direction on the platform with their heads at the inner edge portion 2a of the platform 2. When the milking stall 3 has rotated to a second rotational position $p_2$, the robot arm 9 is activated and it fetches the teat cups 10 from the teat cup magazine 8 and attaches them to the cow 1. The milking process of the cow 1 starts when all teat cups 10 have been attached to the cow 1. The milk meter 23 supervises the milk flow during the milking process. As soon as the milk flow drops below a predetermined value, a removing device removes the teat cups 10 from the teats of the cow 1.

The milking process proceeds during nearly one revolution on the platform 2. The teat cups 8 are usually removed before the milking stall 3 reaches a second last rotational position $p_{n-1}$. In the second last position $p_{n-1}$, a treatment supplying device may spray a disinfecting medium or another kind of treatment medium to the teats of the cow 1 after that the teat cups 8 have been removed. When the milking stall 3 reaches a last rotational position $p_n$, the retention bar 44 is moved to an open position and the cow 1 leaves the milking stall 3 and enters the exit area 18. Thereafter, the milking stall 3 again is rotated to the first rotational position $p_1$ and be ready for receiving a new cow 1. If the milking process of the cow 1 has not been finished before the milking stall has reached the second last rotational position $p_{n-1}$, the retention bar 44 is maintained in the closed position such that the cow 1 rotates a further lapse on the platform 2.

The valve members 26 are in a closed position during the milk processes in the milking stalls 3. Consequently, the milk is collected in the local receivers 24 until the control unit 11 receives information from the detecting member 23a about the quality of the milk. If the milk has an acceptable quality, the control unit 11 sets the valve member 26 in an open position such that the milk in the local receiver 24 flows to the first part of the common milk line 27 and further to the milk tank 32 outside the platform 2 as soon as the milking process has ended.

If the milk in the local receiver 24 has an unacceptable quality, the control unit 11 does not open the valve member 26 and the milk is maintained in the local receiver 24 until all cows have been milked before it is time to perform a complete washing process of the milking parlour. Thereby, the milk of unacceptable quality is not mixed the milk of acceptable quality in the common milk tank 32. A complete washing process of the milking parlour may be performed with intervals of about 8 hours. In order to prevent access to this milking stall 3 until the complete washing process is initiated, the milking stall 3 is blocked by means of the control unit and the retention bar 44.

FIG. 3 shows two vacant milking stall 3a where the retention bar 44 is in a closed position. These milking stalls 3a are blocked. In this case, the control unit 11 controls the retention bar 44 in the milking stall 3 such that it does not open when it arrives to the first rotational position $p_1$. The cow 1 in the first position of the entrance passage 15 in FIG. 3 has here to wait until a following milking stall 3 arrives to the first rotational position $p_1$. FIG. 3 shows two vacant milking stall 3b where the retention bar 44 is in an open position. Since the milking parlour is based on voluntary milking, all milking stall 3 are not occupied during all period of times.

Before the washing process starts, the control unit 11 set the valve member 35 in a position such that the milk in the second part of the common milk line 31 directs the milk tank 33 for unacceptable milk. Thereafter, the control unit 11 opens all valve members 26 such that the maintained unacceptable milk in the local milk receivers 24 flows to the first part of the common milk line 27. The milk is sucked to the common receiver 28 by means of the vacuum source 29. The pump 30 pumps the milk from the common receiver 28 to the second part of the common milk line 31 and into the milk tank 33 for unacceptable milk.

The common milk tank 32 is emptied by means of, a valve member 45. The wash hoses 37 are connected to the connections 38a of the wash line 38 at the outer periphery of the platform 2. A valve member 46 is opened such that the milk tank 32 is connected to the system washing unit 36 via a conduit 42. Thereafter, the system washing unit 36 is activated such that it supply a washing liquid to the wash line 38. The washing liquid is circulated through all milk lines and associated components of the milking parlour by means of the vacuum source 29 and the pump 30.

The invention is not restricted to the described embodiment but may be varied freely within the scope of the claims.

The invention claimed is:

1. A rotary milking parlour, comprising:
   a rotary platform (2);
   a plurality of milking stalls (3) arranged on the rotary platform (2);
   a common milk tank (32);
   at least one common milk line (27, 31) conducting milk from the milking stalls (3) to the common milk tank (32);
   a local milk line (22, 25a, 25b) connected to teat cups (10) at each milking stall (3) and that conducts milk from the teat cups (10) in each milking stall to the common milk line (27, 31);
   a detecting member (23a) at each milking stall that detects a quality of the milk at each respective milking stall;
   a local milk receiver (24) at each milking stall that collects the milk from the local milk line (22, 25a, 25b);
   a valve member (26) at each milking stall that controls milk flow from each local milk receiver (24) to the common milk line (27, 31); and
   a control unit (11) that
   i) controls each valve member (26) such that, for each respective milking stall with an animal being milked during a current milking process, the milk from that animal is retained in the respective local receiver (24) during a whole of the current milking process of that animal,
   ii) receives information about the quality of the milk from each respective detecting member (23a), and
   iii) during a milking period of the milking parlour extending between two following washing processes of the common milk line (27, 31), controls the valve member (26) of each respective milking stall to discharge milk of acceptable quality from each local milk receiver (24) via the common milk line (27, 31) to the common milk tank (32), before discharging any unacceptable quality milk from any local milk receiver (26) to the common milk line (27, 31).

2. A rotary milking parlour according to claim 1, wherein the milking period is between 6 to 12 hours.

3. A rotary milking parlour according to claim 1, wherein the control unit (11) controls the each valve member (26) such that the milk of acceptable quality is discharged from each local receiver (24) to the common milk tank (32) before a following milking process, subsequent to the current milking process, starts in the milking stall (3).

4. A rotary milking parlour according to claim 1, further comprising a common milk tank (33) for the unacceptable quality milk, and wherein the control unit (11) controls the valve member (26) such that the unacceptable quality milk in any local receiver (24) is discharged, via the common milk line (27, 31), to a common milk tank (33) for the unacceptable quality milk.

5. A rotary milking parlour according to claim 1, further comprising a movably arranged blocking member (15a), and wherein the control unit (11) controls motion of the blocking member (15a) such that the blocking member prevents following animals from entering an individual milking stall after the unacceptable quality milk been detected from an animal milked in the individual milking stall such that the individual milking stall remains vacant when the platform rotates during a remaining part of the milking period after the animal milked in the individual milking stall has left the individual milking stall.

6. A rotary milking parlour according to claim 5, wherein,
   the blocking member (15a) is arranged in a passage (15) leading to at least one milking stall (3) on the platform (2), and
   the blocking member (15a) is movably arranged between i) an open position that allows an animal (1) to enter the milking stall (3), and ii) a closed position that prevents an animal (1) from entering the milking stall (3).

7. A rotary milking parlour according to claim 5, wherein, the blocking member (15a) is positioned outside the platform (2) in the passage (15) leading to the at least one milking stall (3) on the platform (2) or on the platform (2) in a passage (3a) leading to at least one milking stall (3).

8. A rotary milking parlour according to claim 1, wherein each detecting member (23a) is integrated in a milk meter (23) in the local milk line (22, 25a, 25b).

9. A rotary milking parlour according to claim 1, wherein each local milk receiver (24) is arranged in a position at the inner periphery of the rotary platform (2).

10. A rotary milking parlour to claim according to claim 1, wherein each local milk receiver is positioned at a level below an upper surface of the platform (2).

11. A method for a rotary milking parlour, comprising:
    operating the rotary milking parlour for a milking period, the rotary milking parlour comprising a rotary platform (2); a plurality of milking stalls (3) arranged on the rotary platform (2); a common milk tank (32); at least one common milk line (27, 31) conducting milk from the milking stalls (3) to the common milk tank (32); a local milk line (22, 25a, 25b) connected to teat cups (10) at each milking stall (3) and that conducts milk from the teat cups (10) in the milking stall to the common milk line (27, 31); a detecting member (23a) at each milking stall that detects a quality of the milk at each respective milking stall; a local milk receiver (24) at each milking stall that collects the milk in the local milk line (22, 25a, 25b); a valve member (26) at each milking stall that controls milk flow from each local milk receiver (24) to the common milk line (27, 31); and a control unit (11), wherein the milking period extends between two following washing processes of the common milk line (27, 31);

automatically, via the control unit, controlling each valve member (26) such that, for each respective milking stall with an animal being milked during a current milking process, the milk from that animal is retained in the respective local receiver (24) during a whole of the current milking process of that animal;

automatically having the control unit receive information about the quality of the milk from each respective detecting member (23*a*); and automatically, via the control unit, controlling each valve member (26) during the milking period of the milking parlour extending between the two following washing processes of the common milk line (27, 31), by controlling the valve member (26) of each respective milking stall to discharge milk of acceptable quality from each local milk receiver (24) via the common milk line (27, 31) to the common milk tank (32), before discharging any unacceptable quality milk from any local milk receiver (24) to the common milk line (27, 31).

12. A method according to claim 11, wherein the milking period is between 6 to 12 hours.

13. A method according to claim 11, wherein in the step of controlling each valve member (26) of each respective milking stall to discharge the milk of acceptable quality, the milk of acceptable quality is discharged from each local receiver (24) to the common milk tank (32) before a following milking process starts in each respective milking stall.

14. A method according to claim 11, wherein in discharging any unacceptable quality milk from any local milk receiver (24), the unacceptable quality milk is discharged via the common milk line (27, 31) to a common milk tank (33) for unacceptable quality milk.

15. A method according to claim 11, comprising a further step, when the milk of unacceptable quality has been detected from an animal milked in a corresponding individual milking stall, of preventing following animals from entering the individual milking stall so that the individual milking stall remains vacant during a remaining part of the milking period after the animal milked in the individual milking stall has left the individual milking stall.

16. A method according to claim 15, wherein the step of preventing following animals from entering into an individual milking stall during the remaining part of the milking period uses a movably arranged blocking member (15*a*).

17. A method according to claim 16, wherein, the blocking member (15*a*) is arranged in a passage (15) leading to at least one milking stall (3) on the platform (2), and the blocking member (15*a*) is movably arranged between an open position that allows an animal (1) to enter the milking stall (3), and a closed position that prevents the animal (1) from entering the milking stall (3).

18. A method according to claim 16, wherein the blocking member (15*a*) is positioned outside the platform (2) in a passage (15) leading to the at least one milking stall (3) on the platform (2).

19. A method according to claim 16, wherein the blocking member (44) positioned on the platform (2) in a passage (3*a*) leading to at least one milking stall (3).

20. A method according to claim 11, wherein in the step of receiving information about the quality of the milk from each respective detecting member (23*a*), each detecting member (23*a*) is integrated in a milk meter (23) in the local milk line (22, 25*a*, 25*b*), and the local milk receiver (24) is arranged in a position at the inner periphery of the rotary platform (2), or at a position at a level below an upper surface of the platform (2).

\* \* \* \* \*